June 5, 1956  J. MIKULAK ET AL  2,749,421
WELDING HEAD POSITIONER
Filed June 17, 1954  6 Sheets-Sheet 2
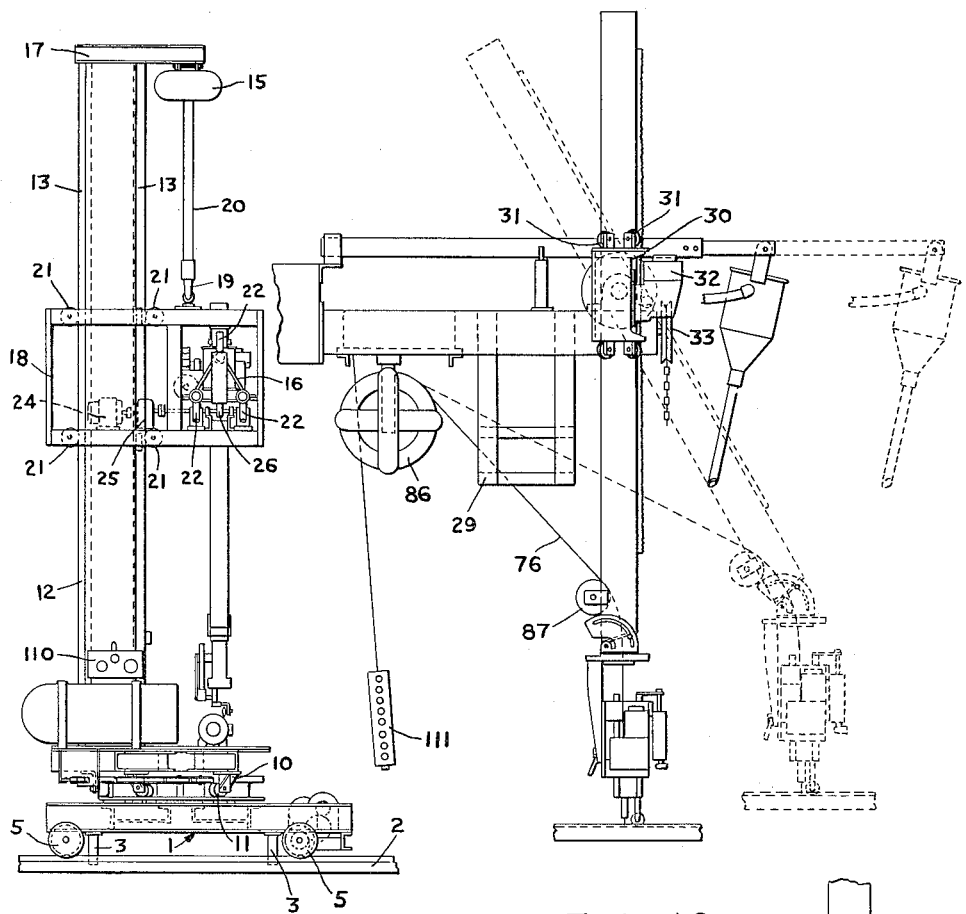
FIG. 2
FIG. 10
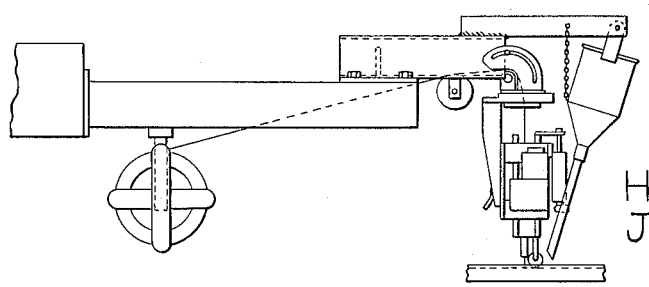
FIG. 16
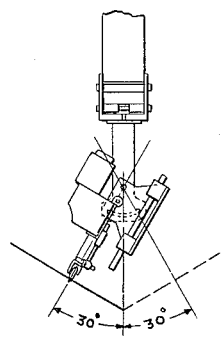
FIG. 11
HUGHE WOTITZKY
JOHN MIKULAK
INVENTORS
BY

HUGHE WOTITZKY
JOHN MIKULAK
*INVENTORS*

BY

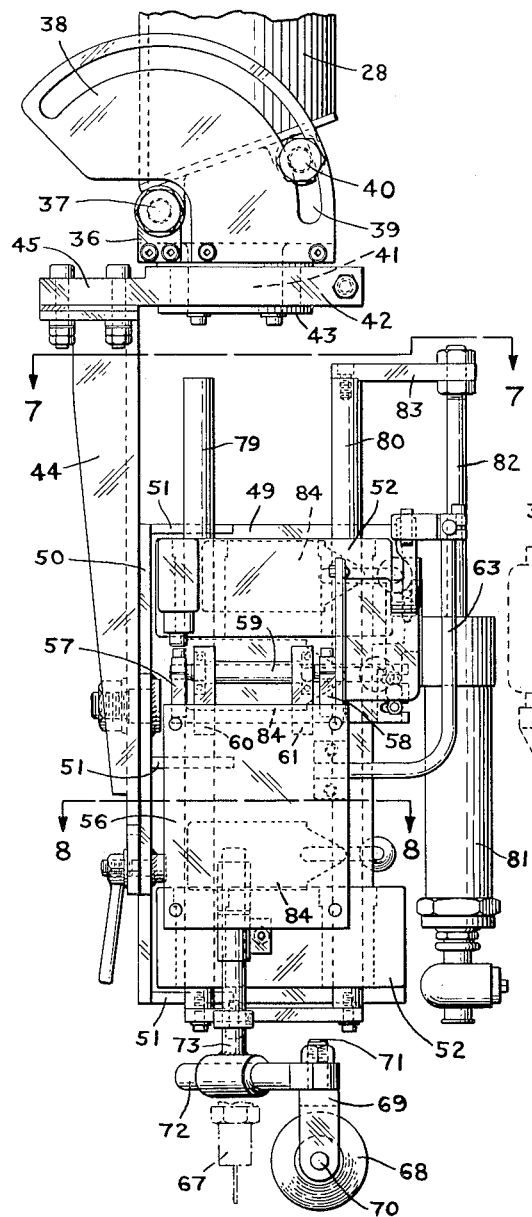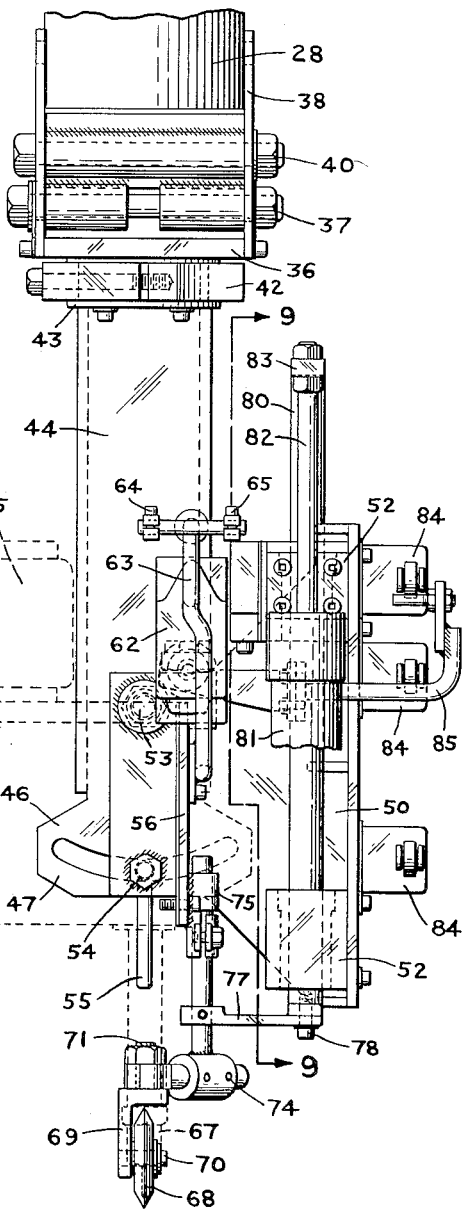
FIG. 5
FIG. 6
HUGHE WOTITZKY
JOHN MIKULAK
INVENTORS

HUGHE WOTITZKY
JOHN MIKULAK
*INVENTORS*

June 5, 1956  J. MIKULAK ET AL  2,749,421
WELDING HEAD POSITIONER
Filed June 17, 1954  6 Sheets-Sheet 6
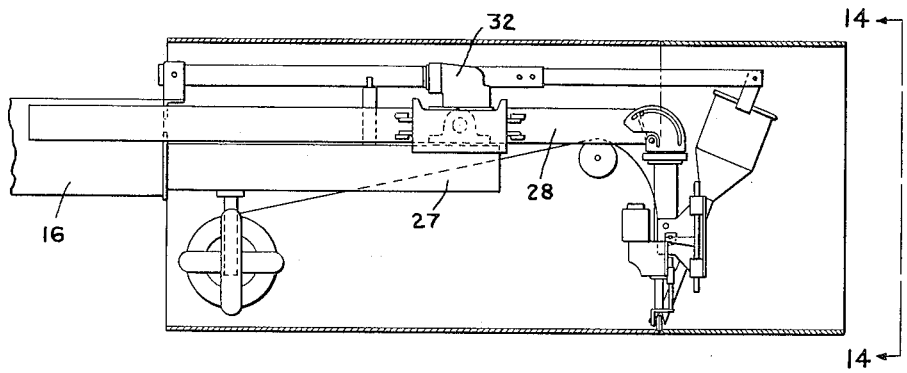
FIG. 13
FIG. 14
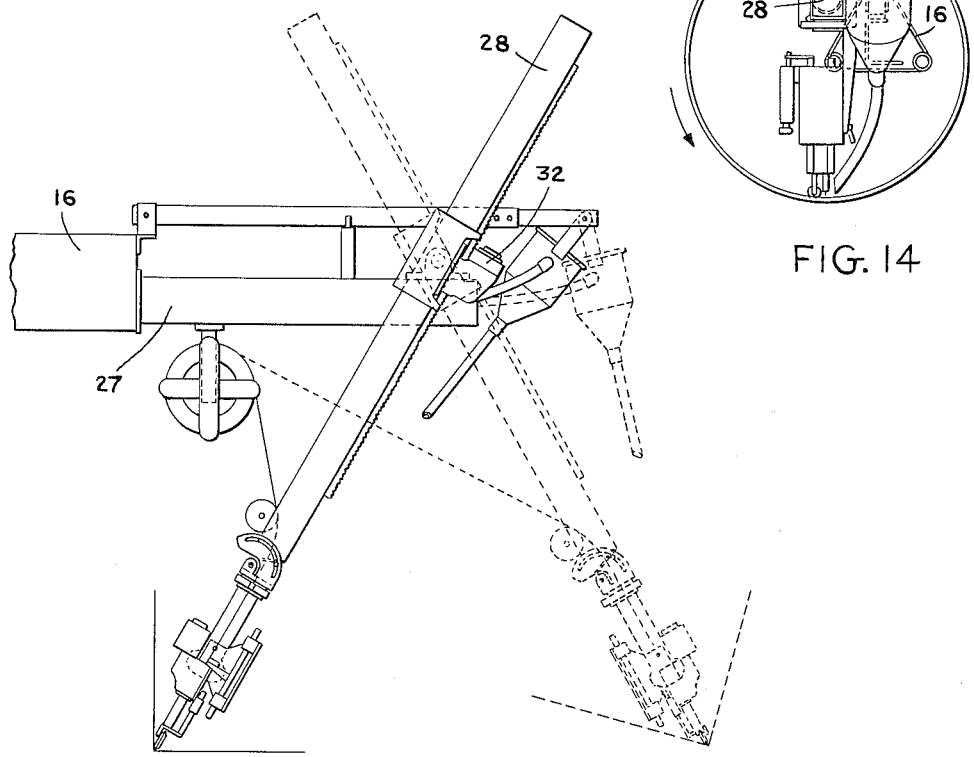
FIG. 15
HUGHE WOTITZKY
JOHN MIKULAK
INVENTORS
BY Robert Meyer
atty

United States Patent Office 2,749,421
Patented June 5, 1956

2,749,421
WELDING HEAD POSITIONER

John Mikulak, Chatham, and Hughe Wotitzky, North Arlington, N. J., assignors to Worthington Corporation, Harrison, N. J., a corporation of Delaware Application June 17, 1954, Serial No. 437,452

5 Claims. (Cl. 219—8)

This invention relates to a welding head positioner with a gantry and boom mounting, and more particularly to a suspension assembly wherein the welding head has universal motion thru pivoted, sliding, and rotatable connections.

In the application of automatic welding, it was generally thought of as a single process suitable only for production requiring long welded joints and of mass quantity. Consequently, automatic welding equipment and tooling were designed for this type of application. The use and perfection of the semi-automatic welding process has shown that the automatic welding process can be used to a great economical and weld quality advantage in job shop production. Inasmuch as the main difference existing between the fully automatic and semi-automatic is the use of a more universal positioner in the latter, namely the hand, it is only necessary to tool the fully automatic for more universal manipulation to obtain relatively equal results in both processes.

It is an object of the present invention to provide the necessary universal movements to position the fully automatic head. This includes positioning the wire for welds such as fillets, lap welds, single bevel, half open corner welds, as well as butt welds and also includes reaching joints at various elevations and horizontal locations. Further, it provides for making inside and outside welds in one set-up as well as reaching into assemblies or over welding fixtures. Provision is also made for making welds in both forward and reverse in either longitudinal or transverse directions. By employing rotating fixtures all circular welding can be done on the same set-up with the longitudinal and transverse welding.

It is another object of this invention to provide allowance for variation in fit-up and set-up caused by tolerances in steel mill practices and shop fabrication operations with a full floating and oscillating head.

It is still another object of this invention to accomplish these universal movements at faster, more economical speeds and with considerably more accurate and uniform quality control.

A further object of the invention is to eliminate the necessity of elevators or climbing on the part of the operator by providing an operators' carriage.

Another object of the invention is to provide automatic means to handle welding flux to the arc and also for removing excess flux from the welded area. Similar provision can be made for providing inert gases for the gaseous shielded arc process.

Any type of automatic welding head for the submerged arc or gaseous shielded arc can be applied to the positioner, and, in addition, any type of welding generator or transformer can be used for welding power source.

Several modifications can be made to this equipment to provide features to fit a particular installation which may range from a mass production shop to a job shop.

With these and other objects in view, as may appear from the accompanying specification, the invention consists of various features of construction and combination of parts, which will be first described in connection with the accompanying drawings, show a welding head positioner of a preferred form embodying the invention, and the features forming the invention will be specifically pointed out in the claims.

In the drawings:

Figure 2 is a side elevation of the welding head positioner showing travel of boom structure.

Figure 5 is a front view of the welding head suspension assembly with the welding head removed.

Figure 6 is a side view of the welding head suspension assembly including the welding head.

Figure 10 is a front view of the boom extension showing two vertical position settings.

Figure 11 is a partial view showing the welding head tilted on a 30° angle.

Figure 13 is a partial view showing the invention applied to the inside of a cylindrical structure.

Figure 14 is an end view of Fig. 13.

Figure 15 is a partial view of the invention showing two adjustable settings for reaching into corners.

Figure 16 is a partial view of the invention showing the welding head mounted directly on the boom structure.

Figure 1:
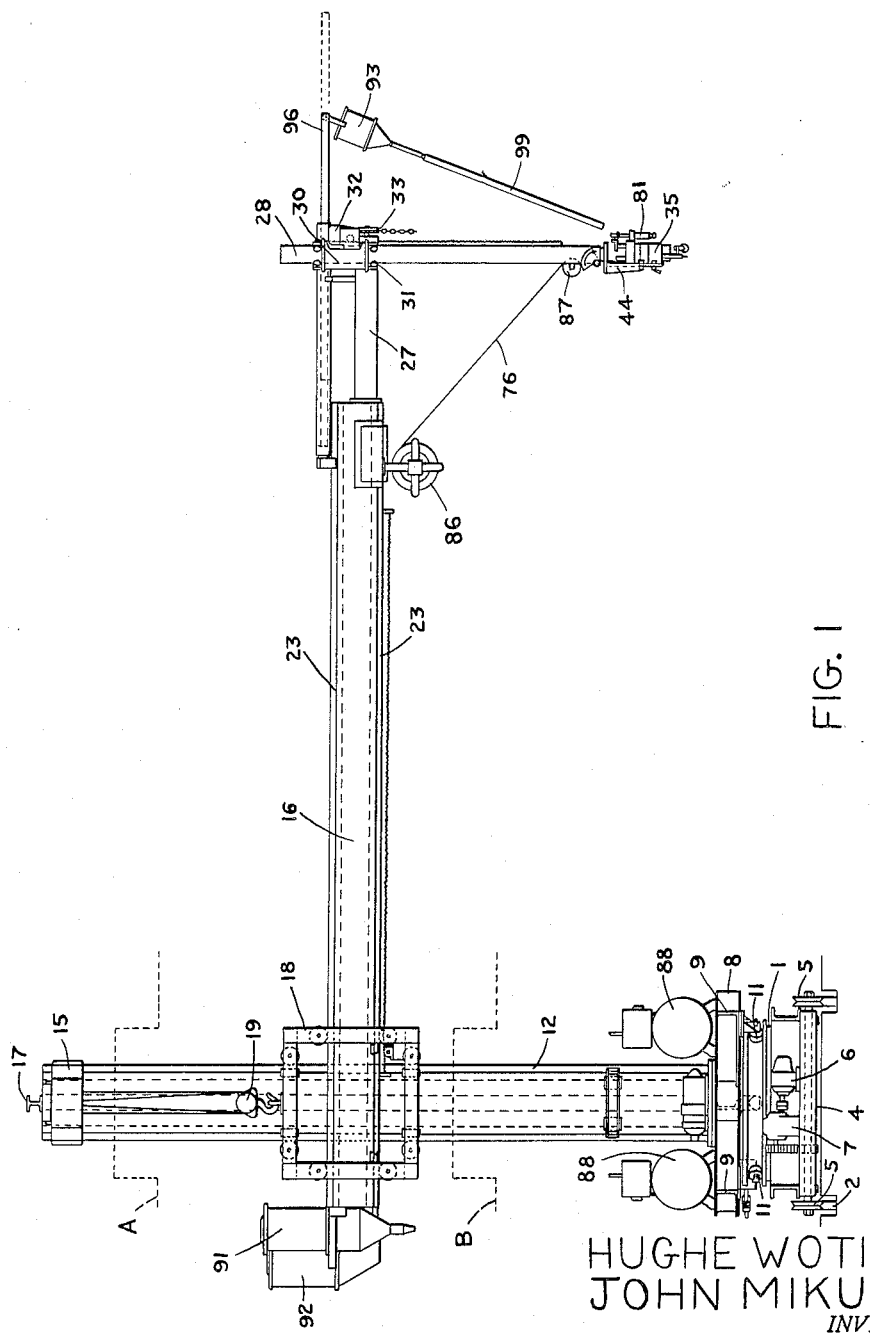
Figure 1 is a front elevation of the welding head positioner.

Referring to the drawings, the welding head positioner is illustrated in Fig. 1 of the drawings showing the arrangement of the various parts, including the carriage 1 on which the machine rides.

The carriage 1 is propelled on V-shaped tracks 2 which are grouted to the floor with their length determined by individual requirements. The V-shaped tracks provide self-cleaning from welding flux and shop dirt and with the aid of wipers will provide smoother operation. However, the regular railroad type of track may be used. The inner side of the tracks is channelled to receive the safety locks 3 as shown in Fig. 2 provided to prevent overturning of the machine in the event that an accidental load is applied to the crane.

The carriage 1, suitably mounted on the geared shaft 4 joining the grooved wheels 5, is generally driven by a variable speed electronic drive with a 1½ H. P. motor 6 thru a gear reducer 7. The speed range may vary from 6" per minute to a top speed of 240" per minute, the high speed being especially useful in moving from one position to another in preparation for welding.

The turntable 8, rotatably mounted and carried by the carriage 1 is supported by channel shaped beams 9 extending diagonally inward from the outer edges of the table. The beams are mounted by brackets 10 on rollers 11 and by this means it is possible to rotate the table and thus the column a full 360°. The table can be turned either manually or by motor and is held in the desired position by a solenoid operated brake. With the use of several set-up gangs it is possible to apply the present invention to various fixtures generally necessary in job shop plants. The positioner can be rotated from one fixture to another to provide a high operating factor and result, therefore, in high production output.

For installations not requiring the turning table 8, the carriage 1 can be used for supporting the column 12.

Figure 3:
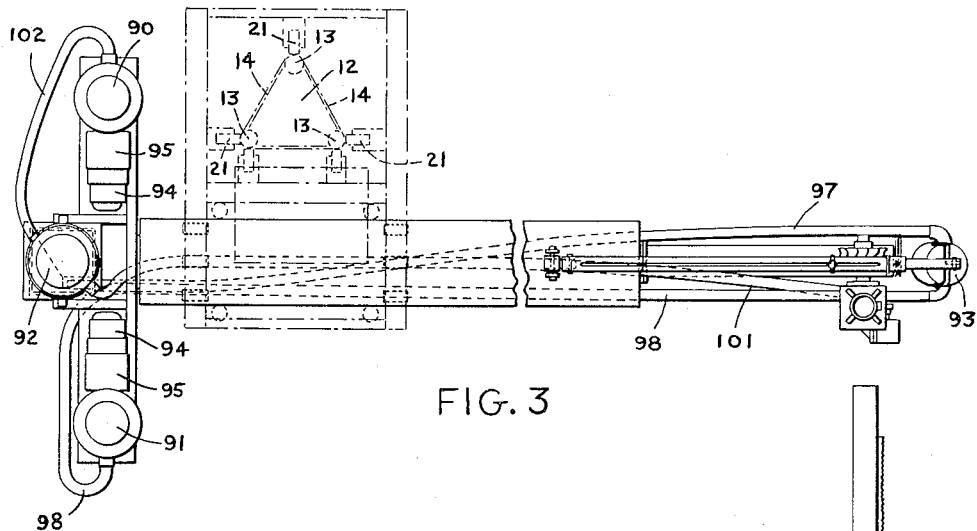
Figure 3 is a top plan view of the boom structure.

The column 12 is a rigid structure made in a triangular fashion as indicated in Fig. 3, and is fabricated from tubular members 13 and diaphragm shear plates 14. It is provided with an electric hoist 15 indicated in Figs. 1 and 2, moving the boom 16 up and down the column 12. The operating limits of the boom are shown in Fig. 1 at positions A and B. The hoist 15 is bolted to an overhead support 17 clearly shown in Fig. 2, which, in this particular application is an I-beam placed across the top of the column.

A saddle bracket 18, suspended from the hoist 15 by block 19 and tackle 20, supports the boom 16 and is guided on the column 12 by rollers 21 riding on the surfaces of the tubular members 13. The rollers 21 are provided with eccentric shafts to make adjustments at installation to remove the looseness due to manufacturing tolerances or thru wear. Limit switches and mechanical dead men prevent damage.

The boom 16, a rigid structure identical in design to the column 12, is also guided by rollers 22 riding on the tubular members 23 thru the saddle bracket 18 as shown in Fig. 2. For horizontal adjustment the boom is driven by a motor 24 with a gear reducer 25 and pinion gear 26 to engage the gear rack (not shown) on the underside of the boom. The driving equipment carried on the saddle bracket 18 may vary in speed from a minimum of 6 inches to 240 inches per minute.

The broom 16 is provided with a greater reach by the use of the boom extension 27 that is attached to the end of the boom proper as illustrated in Fig. 1. The extension 27 carries the welding stick 28 and welding equipment hereinafter described and may be supplied with an operators' carriage 29 as shown in Fig. 10 if desired.

The mounting of the welding stick on the boom extension is shown more clearly in Fig. 10. If desired, the stick may be mounted directly on the boom itself. The stick is held by means of a guide box 30 bolted thereon. The guide box as the name implies is built as a box being substantially square in cross-section. Rollers 31 extend diagonally inward from the inside corners of the box at its upper and lower extremities. The welding stick is substantially cylindrical and adapted to pass thru the vertical center of the box and guide on the rollers 31.

The raising and lowering of the stick may be operated manually or by the gear motor 32 engaging with a gear rack provided on the stick. Rotation in the vertical plane is obtained thru a manual chain drive 33 from the horizontal position thru an angle of 120°.

As shown in Fig. 10, the welding stick provides further universal application to the machine. With the above-mentioned movements it is possible to reach corners in recessed openings as shown in Fig. 15, and inside horizontal and vertical openings as shown in Figs. 13 and 14. These figures further illustrate the relative reach and weld head positioning that can be obtained by merely swinging the stick and raising or lowering it in its support without moving the boom.

*Welding head suspension assembly*

The welding head 35, of a type purchasable on the open market is mounted on a suspension assembly shown in detail in Fig. 5 and 6, hingedly connected to the welding stick by the hinge plate 36 with bolt 37. The suspension assembly may thus be pivoted about the lower end of the welding stick 28 and is locked in the desired position. The locking device is the plate 38 screwed to the hinge plate and having an arcuate slot 39 of 120° which is tightened by threaded means 40 extending thru the slot.

On the underside of the hinge plate a boss-like protrusion 41 extends downward and is received by a circular opening in the turning plate 42. Another plate 43, larger in diameter than the opening is placed over the opening and fastened to the hinge plate by threaded means. The turning plate 42 with the assembly hereinafter described are thus able to rotate freely about the hinge plate 36.

The supporting bracket 44, bolted to the overhanging portion 45 of the turning plate is channel-shaped and extends downward increasing in width in the lower section 46 with the arcuate slot 47 open therein.

Figure 7:
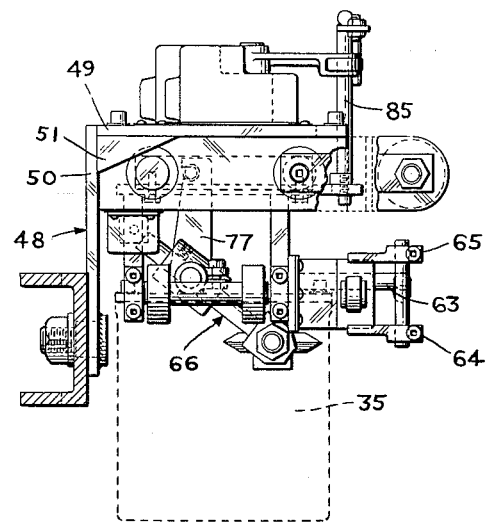
Figure 7 is a sectional view of the welding head suspension assembly taken on the line 7—7 of Fig. 5.
Figure 8:
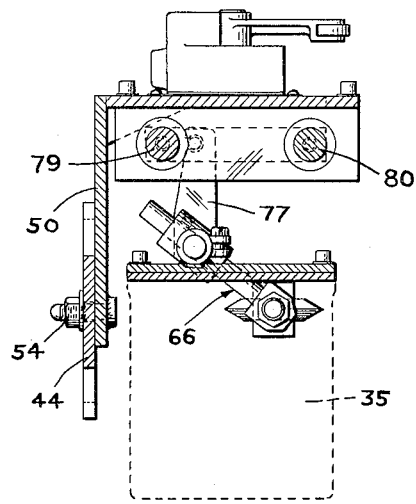
Figure 8 is a sectional view taken on the line 8—8 of Fig. 5.
Figure 9:
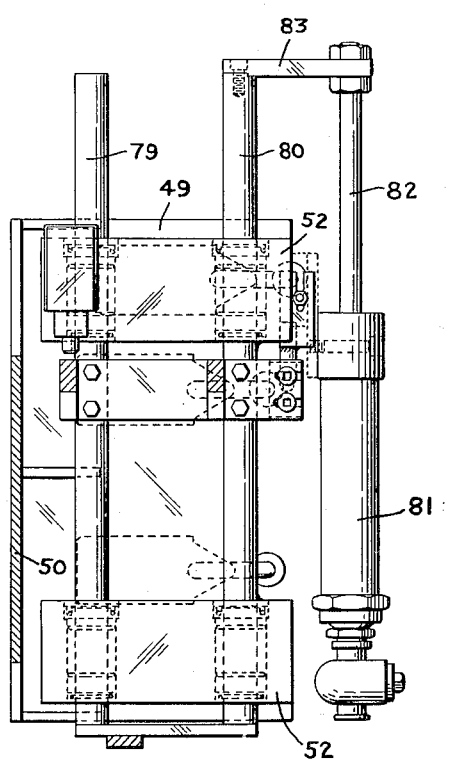
Figure 9 is a sectional view taken on the line 9—9 of Fig. 6.

For clarity a portion of the assembly has been cut away in Fig. 7. The angle bracket 48 is formed by two plates 49 and 50 being welded together at right angles and mounted in an upright position with triangular braces 51 welded to the inside corner at spaced intervals. The plate 49 is substantially rectangular with holes drilled at the upper and lower section to provide for mounting of sliding blocks 52. The sides of the second plate 50 converge toward the mid-section with holes drilled at the outer edge thru which the shoulder screw 53 and bolt 54 pass to connect the angle bracket to the supporting bracket 44. The bolt 54 passes thru the arcuate slot 47 and the entire bracket can thus be pivoted on the shoulder screw 53 to a maximum angle of 30° in either direction. Grooves slightly out of flat position or fillet welds can be welded by swinging the bracket to the desired angle and securing it in position by tightening the lever 55 on the bolt.

The welding head 35 is preferably the automatic type for the submerged or gaseous shielded arc but may be of any other type without departing from the spirit of the invention. It is fastened to the mounting plate 56 which, in turn, is suspended from brackets 57 and 58 by means of the shaft 59 extending thru the bearing lined loops 60 and 61 at the upper edge of the plate. The welding head is thus able to swing slightly to take care of any misalignment in the joint being welded. The distance that the head may swing is held to a controlled minimum by the limit switch 62. The finger bracket 63 fastened to the mounting plate 56 and swinging therewith contacts the limits 64 and 65 of the switch and immediately the operating current is shut off.

A tracing device 66 is clamped to the lower edge of the mounting plate and is adapted to precede the welding electrode 67. It consists of a wheel 68 rotatably mounted on the guide roller bracket 69 by means of a roller stud 70 extending through the wheel, the stud having a knurled head to expedite the changing of wheels. The wheel with the correct profile can trace square butt, bevel on U-butt as well as T joints. The upper portion of the bracket is formed as a stud 71 being threaded thru half its length with the eyebolt 72 fitted over the stud and secured. The shaft of the eyebolt is received by the head of the T-bolt 73 and prevented from movement relative to the T-bolt by a safety set screw 74 tightened against a flat milled on the shaft of the eyebolt. The shaft of the T-bolt is clamped to the mounting plate by the clamping device 75. The tracing wheel can be swivelled around the welding wire 76 which enters thru the center of the assembly, when a change of direction of operation is necessary. All swivels are of the ball bearing type to set up minimum friction and can be locked at any time for straight line motion.

When it is necessary to prevent the welding head from swinging around the shaft 59 the latch 77 located on T-bolt of the tracing device is quickly swung around and a cut out notch engages the bolt 78 securing it in place.

The welding head mounting is also adapted for vertical movement due to irregularities of surface. The aforementioned brackets 57 and 58, from which the mounting is suspended, are fastened to two shafts 79 and 80 which ride up and down in the bearing-lined sliding blocks 52 mounted on the angle bracket 49. The movement of the shafts is cushioned by a fluid operated cylinder 81 mounted on the angle bracket with the piston 82 reciprocating therein linked to shaft 80 at 83. During operation, the electrode 67 is protected from damage by sudden drop as the end of the plate welded is reached by the pressure in the cylinder 81. The cylinder may be of the air or hydraulic type with or without a dash pot, any of which are purchaseable on the open market.

This floating type of assembly is also a great aid in damping out vibrations transmitted to the equipment from outside sources as well as those produced in the equipment thereby minimizing the effect on the arc pool and head apperance.

The vertical movement of the head thru the shafts is of course limited so switches 84 mounted on the angle bracket are contacted by the finger bracket 85 traveling with the head as the limits are reached. The switches actuate the motor 32 operating the welding stick 28 to raise or lower it as the conditions require.

In order that the welding head support assembly may be moved freely without removing the welding wire 76 from the head, the wire is fed from a reel 86 mounted on the boom extension thru a guide roller 87 on the welding stick down thru the center of the welding head suspension assembly.

Current is supplied to the welding equipment by the generators 88 mounted on the turntable 8.

The flux handling system

Figure 4:
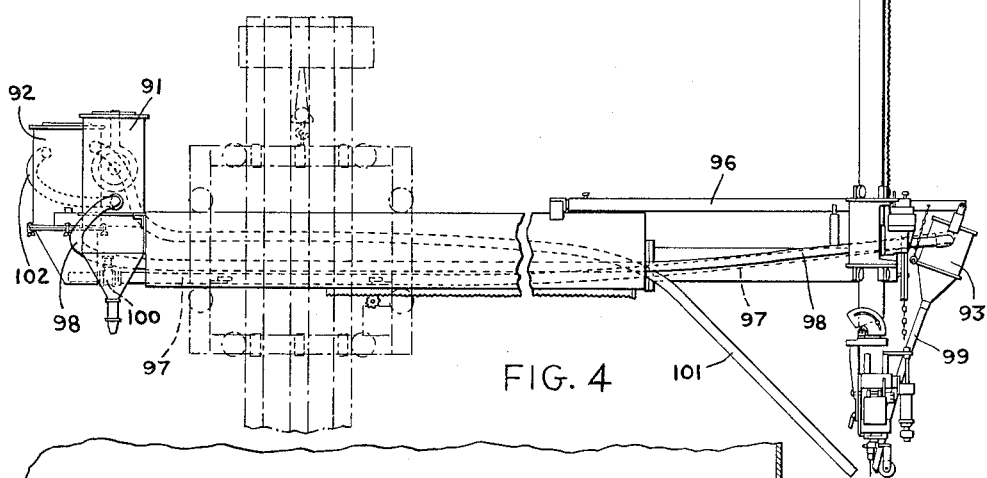
Figure 4 is a side view of the boom structure.
Figure 12:
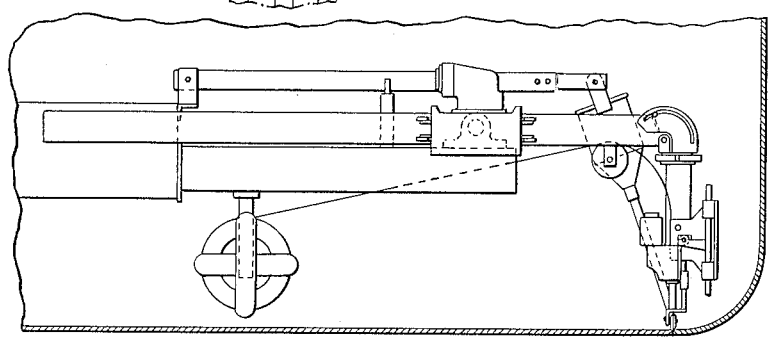
Figure 12 is a partial view showing the invention applied in a close corner.

The flux handling system includes two suction units 90 and 91, in Figs. 3 and 4, working on one primary tank 92, unit 90 connected directly to the tank 92, unit 91 connected indirectly to the tank thru the flux hopper 93. Direct current motors 94 drive each of the turbine type vacuum producers 95 connected to the suction tanks 90, 91, the vacuum producers operating in the usual manner withdrawing air from the suction tanks.

The flux hopper 93, supplying the flux to the welding work, is substantially cylindrical with a funnel-shaped bottom and is suspended from a telescoping arm 96 mounted on the boom at a location convenient to the welding head 35. The tube 97 connects the primary tank 92 to the hopper 93 and the line 98 passes from the hopper along the boom to the suction tank 91. An insulated telescoping tube 99 extending from the bottom of the funnel transmits the flux from the hopper 93 to a short distance preceding the line of welding.

In operation the suction tank 91 creates a flow of air thru the tube 98 and the hopper 93 thereby drawing the flux from the primary tank 92 thru the by-pass valve 100 into the tube 97 and as it enters the hopper the flux falls to the bottom by gravity. By means of the by-pass valve 100 the flow of air and consequently the flux is controlled and as the hopper is filled the resistance in the flux line 97 is increased to overcome the suction head so that the flux flow ceases. The hopper holds enough flux to provide sufficient capacity so that smooth and even flux feed is provided to the arc thru the tube 99.

The tube 101 connected to the primary tank 92 is carried along the boom and drops to a position behind the welding head. In this manner, after the weld has been made, the excess flux is picked up by the suction in tube 101 created by the suction unit 90 connected by the line 102 to the primary tank 92. The tube 101 returns the excess flux to the primary tank 92 and as the flux enters a baffle obstructs the flow path and the flux falls thru a slag separator (not shown) to the bottom of the tank where it is returned to the feed line 97.

Controls

The operation of the welding head positioner is controlled by a dual welding control which consists of a selector type switch at the welding head and a manual push button control box 110 at the column.

The controls at the column include horizontal and vertical movement of the boom, forward and reverse movement of the carriage, flux feed, motor generator and transformer start-stop, and all control and motor power start-stop.

The controls at the welding head will move the boom horizontally, the carriage forward and reverse and adjust for manual or automatic operation. Push buttons on the pendant station 111 and on the welding head proper will motivate these controls.

In addition, other manual controls available at the welding head will control the welding voltmeter, ammeter and rheostats, all horizontal movement of the boom, movement of the carriage, raising and lowering the welding stick and welding head.

A remote pendant control may be furnished which the operator can hold in hand to move the boom both horizontally and vertically, to move the carriage and to raise or lower the welding stick.

It is believed from the preceding description the operation of the machine is understandable, however, to clarify the sequence of operation the following resume is made.

All the motors and welding generators are started, the controls energized and the flux recovery unit placed in operation. The carriage is then moved into the approximate starting position and the boom adjusted to the required height. If the operator is to ride in the operators' carriage he should be situated before the machine is positioned. The movement and sequence of the automatic components are selected and the automatic sequence circuit energized. After the welding head and flux hopper are positioned, the weld wire may be inched up to starting position and the flux flow valve opened. In the particular type of welding equipment shown a button located on the welding head is pressed to energize the welding circuit. After the welding is completed, the welding sequences are stopped by deenergizing the circuit at the welding head and the pendant station. The flow of the flux is turned off by the control at the column. The operator is then prepared to proceed to the next position and repeat the above sequence.

It will be understood that the invention is not to be limited to the specific construction or arrangement of parts shown, but that they may be widely modified within the invention defined by the claims.

What is claimed is:

1. In an automatic welding head positioner including a carriage, a turntable rotatably mounted on said carriage, a vertical column supported by said turntable, a transverse member mounted on said vertical column having horizontal and vertical movement relative to said column, and means for adjusting and holding the position of said transverse member on said column, the combination with said transverse member of a motor operated welding stick movably mounted thereon, a welding head, a suspension assembly hingedly connected to said welding stick, means for mounting said welding head on said suspension assembly, including a mounting plate having loops thereon, a shaft extending thru said loops, a bracket assembly slidably mounted in said suspension assembly, said shaft loosely carried by said bracket assembly to permit said mounting plate to swing therein, limit switches actuated by the movement of said welding head energizing said motor operated welding stick for raising and lowering.

2. In an automatic welding head positioner wherein a rotatable vertical column carries a laterally and vertically displaceable boom member having a welding stick thereon which is movable and rotatable in a vertical plane, the combination with said stick of a welding head, support means for holding said head, and connecting means for attaching the welding head support means to the welding stick comprising a plate member pivotally connected to said stick to permit swinging of said plate member in a vertical plane, a downwardly extending sleeve formed on the plate member having a horizontally extending flange on the lower portion thereof, and a clamp member rotatably mounted on said sleeve and connected to the support means to permit rotation thereof in a horizontal plane to provide universal movement of the welding head with respect to said welding stick.

3. In an automatic welding head positioner wherein a rotatable vertical column carries a laterally and vertically displaceable boom member having a welding stick thereon which is movable and rotatable in a vertical plane, the combination with said stick of a welding head, support means for holding said head, and connecting means for attaching the welding head support means to the welding stick comprising a plate member pivotally connected to said stick to permit swinging of said plate member in a vertical plane, vertical plates disposed on the sides of said plate member having arcuate slots therein, threaded members positioned in said slots to lock said plate member at a predetermined vertical angle with respect to said stick, a downwardly extending sleeve formed on the plate member having a horizontally extending flange on the lower portion thereof, and a clamp member rotatably mounted on said sleeve and connected to the support means to permit rotation thereof in a horizontal plane to provide universal movement of the welding head with respect to said welding stick.

4. In an automatic welding head positioner wherein a rotatable vertical column carries a laterally and vertically displaceable boom member having a welding stick thereon which is movable and rotatable in a vertical plane, the combination with said stick of a welding head, support means for holding said head comprising a vertical bracket member having spaced blocks disposed on the lower portion thereof, vertical shafts disposed for slidable movement in the blocks, horizontal lugs on said vertical shafts, a horizontal shaft extending through said lugs, a mounting plate rotatably carried by said lugs, said welding head being connected to said mounting plate to permit both reciprocating and swinging movement of the head with respect to the bracket member, a vertical channel member having an arcuate slot disposed in the lower portion thereof pivotally connected at the lower end thereof to the bracket member to permit swinging of the bracket member with respect to the channel member, threaded means extending through said channel member slot connected to the bracket member to lock the bracket member at a predetermined vertical angle with respect to said channel member, and connecting means for attaching the welding head support means to the welding stick comprising a plate member pivotally connected to said stick to permit swinging of said plate member in a vertical plane, a downwardly extending sleeve formed on the plate member having a horizontally extending flange disposed on the lower portion thereof, and a clamp member rotatably mounted on said sleeve and connected to the upper end of said channel member to permit rotation thereof in a horizontal plane to provide universal movement of the welding head wtih respect to said welding stick.

5. In an automatic welding head positioner wherein a rotatable vertical column carries a laterally and vertically displaceable boom member having a welding stick thereon which is movable and rotatable in a vertical plane, the combination with said stick of a welding head support means for holding said head comprising a vertical bracket member having spaced blocks disposed on the lower portion thereof, vertical shafts disposed for slidable movement in the blocks, horizontal lugs on said vertical shafts, a horizontal shaft extending through said lugs, a mounting plate rotatably carried by said lugs, said welding head being connected to said mounting plate to permit both reciprocating and swinging movement of the head with respect to the bracket member, a vertical channel member having an arcuate slot disposed in the lower portion thereof pivotally connected at the lower end thereof to the bracket member to permit swinging of the bracket member with respect to the channel member, threaded means extending through said channel member slot connected to the bracket member to lock the bracket member at a predetermined vertical angle with respect to said channel member, and connecting means for attaching the welding head support means to the welding stick comprising a plate member pivotally connected to said stick to permit swinging of said plate member in a vertical plane, vertical plates disposed on the sides of said plate member having arcuate slots therein, threaded members positioned in said plate member slots to lock said plate member at a predetermined vertical angle with respect to said stick, a downwardly extending sleeve formed on the plate member having a horizontally extending flange disposed on the lower portion thereof, and a clamp member rotatably mounted on said sleeve and connected to the upper end of said channel member to permit rotation thereof in a horizontal plane to provide universal movement of the welding head with respect to said welding stick.

References Cited in the file of this patent

UNITED STATES PATENTS

| | | |
|---|---|---|
| 1,827,245 | Lincoln et al. | Oct. 13, 1931 |
| 1,947,300 | Mayoh | Feb. 13, 1934 |
| 1,991,128 | Tripp | Feb. 12, 1935 |